Figure 1:
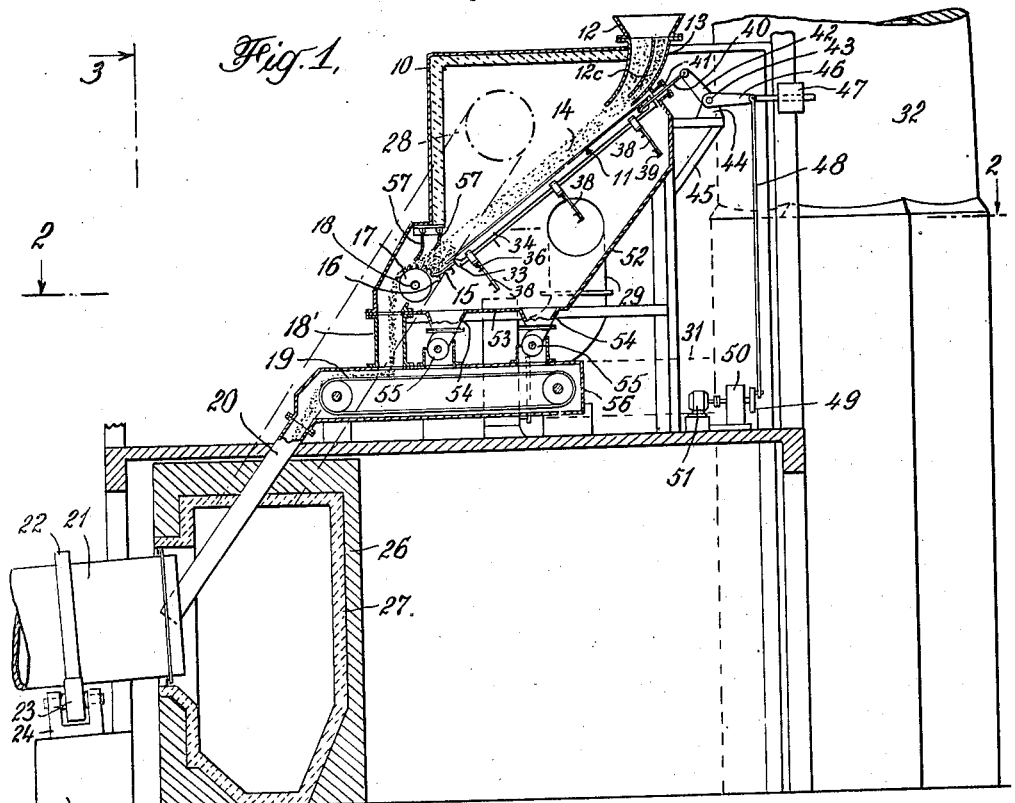

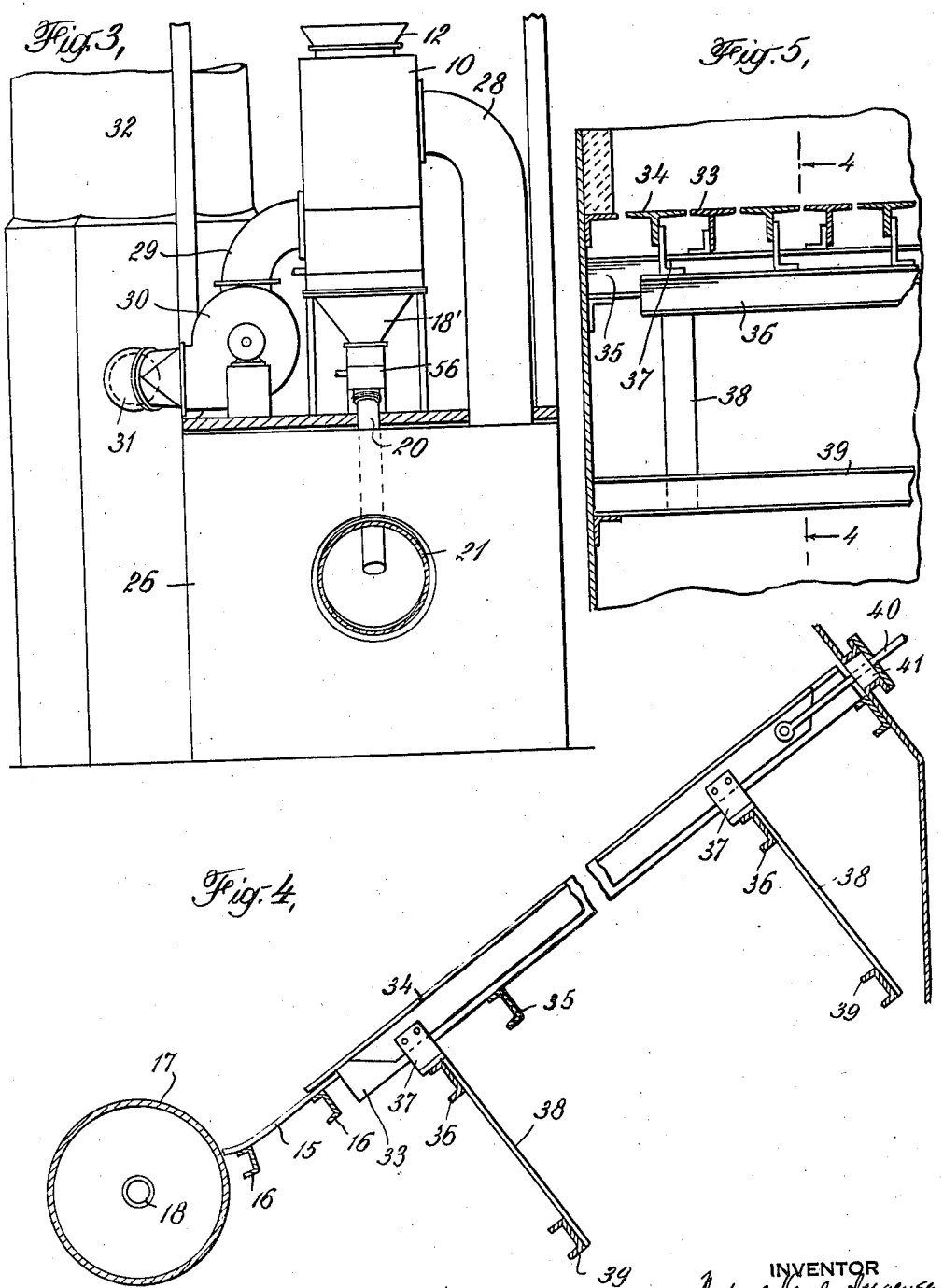

June 17, 1941.  M. VOGEL-JORGENSEN  2,246,024
APPARATUS FOR TREATING GRANULAR OR PULVERULENT MATERIAL
Filed April 19, 1940  3 Sheets-Sheet 3
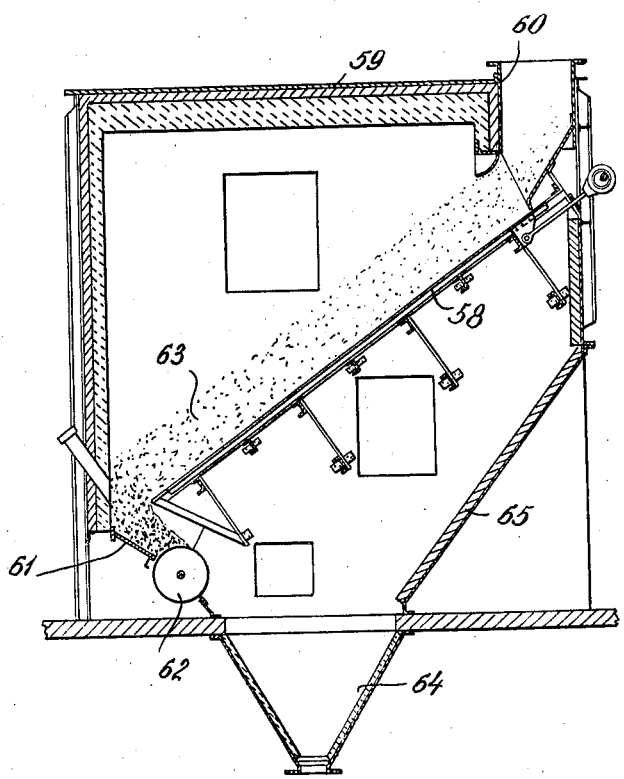
INVENTOR
Mikael Vogel-Jorgensen
BY
ATTORNEYS Patented June 17, 1941

2,246,024

UNITED STATES PATENT OFFICE 2,246,024

APPARATUS FOR TREATING GRANULAR OR PULVERULENT MATERIAL

Mikael Vogel - Jorgensen, Frederiksberg, near Copenhagen, Denmark, assignor to F. L. Smidth & Co., New York, N. Y., a corporation of New Jersey Application April 19, 1940, Serial No. 330,553
In Great Britain April 5, 1939

12 Claims. (Cl. 263—21)

This invention relates to the treatment of solid materials with gases in order to alter the heat content of the materials or to effect chemical changes therein. More particularly, the invention is concerned with a novel method and apparatus by the use of which the operations referred to can be carried on efficiently and without injury to the materials undergoing treatment.

The treatment of solid materials with gases is used for many purposes in the various arts. Thus, cement raw materials, lime, etc., may be preheated by hot gases on their way to a rotary kiln where they are to be burned or calcined, and cement clinker and other materials being discharged from a kiln may be treated with gases for cooling purposes. Other examples of such treatments are the artificial aging of cement by means of carbon dioxide and the roasting or sintering of ores by means of hot gases which either serve merely to give up heat to the solid materials or both accomplish that purpose and also support the combustion of small quantities of fuel mixed with the materials or arranged in alternating strata therewith.

In operations of the type referred to, it has been the common practice heretofore to cause the gases to pass transversely through a gas-permeable layer of the material on a suitable gas-permeable support. In such treatment, it is important that the permeability of the layer to gas should remain uniform throughout the layer and the layer should, therefore, be kept substantially uniform in thickness and not stirred or broken up while the treatment is being carried on. Various forms of apparatus have been used for carrying on such treatments, as, for example, the layer of material has been supported on a travelling grate, but apparatus of that type is objectionable because of its complicated structure and large power consumption. Other forms of apparatus which have been used incluae stationary grates over which the material is moved by pushing elements and grates which are mounted at an inclination such that the material moves down by gravity. In those types of apparatus, however, the layer is broken up or stirred during the treatment so that the desired uniformity of the layer is destroyed, dust is developed, and in those cases where the material being treated is in nodulized form, the nodules are broken.

The present invention is directed to the provision of a method and apparatus for the treatment of solid materials by gases which are free of the objections above pointed out and permit the operation to be carried on at low cost and with uniform results.

The new apparatus includes a gas-permeable support, such as a grate, on which a layer of the material to be treated is deposited, and the support is mounted at an angle to the horizontal which is less than the angle of repose of the material. The material is deposited on the support in a layer which is substantially uniform in thickness and means are provided to cause the layer as a whole to advance down the support step by step and without substantial internal movement, such as localized sliding. The inclination of the support is preferably only slightly less than the angle of repose, and with that arrangement, little power is required to effect the downward movement of the material. The travel of the material leaving the lower end of the support is controlled by means of a rotary member which may be considered as forming a movable end wall over which the material is discharged.

The rotary member may take the form of a drum mounted either directly at the end of the support or in the path of the material as it moves along a surface beyond the end of the support. In either case, the drum serves as a means for holding back or damming the material on the support and insures that the layer will be of uniform thickness and density. Also, since the rate of rotation of the drum determines the rate of discharge of the material from the support, the action of the drum makes certain that the material in the layer will be uniformly treated by the gases and that the treatment will continue for the desired length of time.

Figure 2:
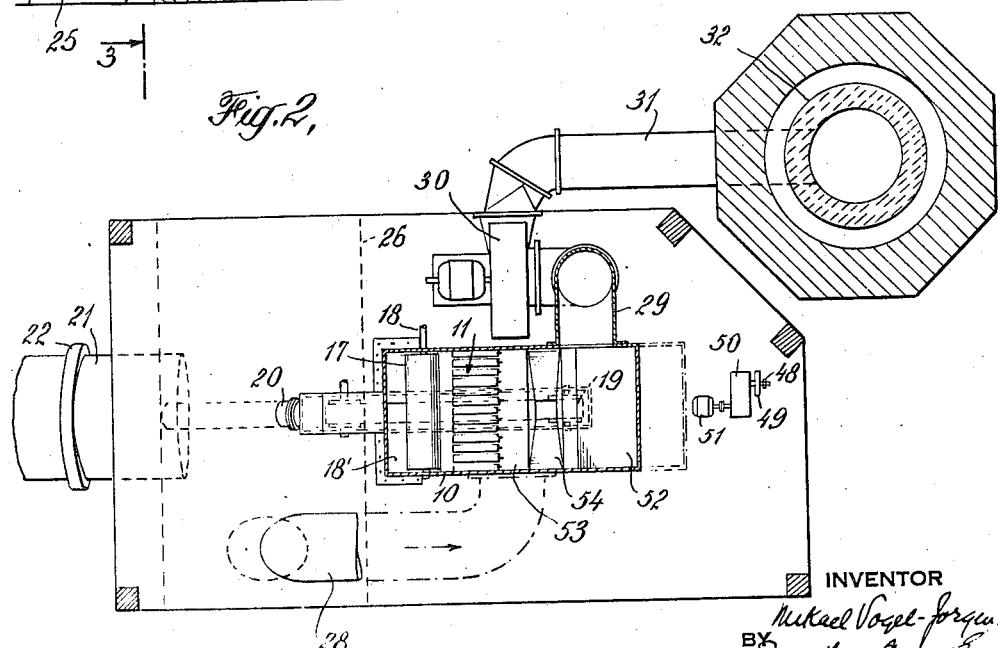

For a better understanding of the invention, reference may be had to the accompanying drawings in which:

Fig. 1 is a vertical sectional view through one form of apparatus of the invention illustrated in association with a rotary kiln to which the treated material is supplied;

Figs. 2 and 3 are sectional views on the lines 2—2 and 3—3, respectively, of Fig. 1;

Figs. 4 and 5 are longitudinal and transverse sectional views, respectively, through portions of the new apparatus; and Fig. 6 is a view similar to Fig. 1 of a modified construction.

Referring to the drawings, the apparatus shown in Fig. 1 is suitable for the preheating of materials to be supplied to a rotary kiln, as for example, calcium carbonate materials which may be preheated with or without partial calcination before being completely calcined in the kiln. The apparatus includes a chamber 10, the upper part of which is lined with firebrick and within the chamber is an inclined support or grate generally designated 11. The carbonate product to be preheated is supplied in pieces of suitable size to a hopper 12 mounted at the top of the chamber 10 and provided with a spout 13 through which the material is discharged upon the surface of the grate. The material forms a gas-permeable layer 14 on the grate and is advanced down the latter by means to be described. At the lower end of the grate 11 is a fixed curved grate 15 supported by suitable channel irons 16, and beyond the curved grate 15 is mounted a rotary drum 17. This drum is water cooled and for this purpose, its trunnions 18, which are supported in suitable bearings, are made hollow so that the cooling fluid may be circulated therethrough. The drum is disposed in such position that a substantial portion therein lies in the path of the layer of material moving over the fixed grate 15 and when the drum is stationary, the material will not pass over it. During the operation of the apparatus, the drum is rotated by any suitable means (not shown) and the speed of rotation determines the rate at which the material leaves the grate and the time during which the material on the grate is subjected to treatment.

The material carried over the top of the drum by the rotation of the latter drops down through a passage 18' to the top of an endless conveyor 19 which delivers the material thereon into a pipe 20 which leads into the upper end of a rotary kiln 21. This kiln includes the usual tubular shell which is provided with live rings 22, each of which is supported by rollers 23 in bearings 24 on a foundation block 25. The upper end of the kiln extends into an opening in the wall of a chamber 26 having a firebrick lining 27, and the hot gases issuing from the kiln flow through the chamber to a duct 28 which leads into the upper part of the chamber 10 above the grate 11. The hot gases flow down through the layer and grate into the space below the latter, whence they are drawn out through a duct 29 connected to a power driven fan 30. The gases discharged by the fan travel through a duct 31 to a stack 32.

The grate 11 comprises a plurality of bars 33, 34 of T-section. The bars 33 and 34 are arranged in alternation and bars 33 are supported in fixed position on angle irons 35 extending across the chamber 10 and supported by the side walls thereof. The bars 34, which are somewhat wider than bars 33, are mounted to reciprocate lengthwise and for this purpose, they are secured to channel irons 36 by means of angle irons 37. The channel members 36 are secured to the upper ends of bars 38 which are attached at their lower ends to channel irons 39 which extend across the chamber 10 and are secured to the side walls thereof.

The members 38 are relatively resilient so that the bars 34 secured thereto may be reciprocated endwise and, for this purpose, a link 40 is connected to one of the bars 34 and passes out of the wall of chamber 10 through a gland 41, the outer end of the link being connected to a lever 42. The lever 42 is fast on a stub shaft 43 mounted in a bearing 44 on a bracket 45 secured to a suitable part of the structure and also fast on the shaft 43 is a lever 46 carrying a counterweight 47. Lever 46 is connected by a link 48 to an eccentric pin on a disc 49 rotated through gearing 50 by a motor 51. In the operation of the device, the motor reciprocates the bars 34 lengthwise and in the plane of the grate and in their downward movement, the bars advance the material in the layer 14 as a whole and without localized sliding or other internal movement. At the end of their downward stroke, the bars 34 overlap and slide on the curved grate 15, the webs of the bars 34 being cut away to permit such action. The return movement of the bars is facilitated by the counterweight 47 and during such movement, the material in the layer remains at rest.

Any material which passes through the spaces between the bars 33 and 34 either slides down the inclined wall 52 of chamber 10 beneath the grate 11 or collects on the bottom wall 53 of the chamber until the material ultimately enters hoppers 54 provided with air locks 55 through which the material passes to be deposited upon the conveyor 19. The conveyor 19 is enclosed within a casing 56 from which the pipe 20 leads and the air locks prevent hot gases from the kiln from flowing upwardly through the pipe, through the casing 56, and into the chamber 10 below the grate 11. Gases are also prevented from entering the chamber 10 from the casing 56 through the passage 18 by flaps 57 secured to the wall of chamber 11 and terminating close to the top of the layer 14.

In the construction illustrated in Fig. 6, a grate similar to the grate 11 is mounted in inclined position in a chamber 59 and material is deposited on the grate by means of a hopper 60 having a discharge spout close to the surface of the grate. The material leaving the grate 58 is deposited on an inclined surface 61 at the end of which is a rotary drum 62 similar to the drum 17. As the drum rotates, the material from the layer 63 which has collected on the surface 61 is carried over the top of the drum and discharged into a hopper 64. The material which passes through the grate either falls directly into the hopper or on the inclined wall 65 below the grate and slides down into the hopper. The hopper 64 discharges the material on a conveyor similar to the conveyor 19 of the Fig. 1 construction.

In both forms of the apparatus, the material in the layer on the inclined grate is advanced down the latter by reciprocation of the movable bars, until the material strikes the rotary drum. If the drum is at rest, the downward movements of the bars are not capable of advancing the material over it, and the drum thus insures that a layer of uniform thickness will be maintained on the grate and this in turn results in the material being uniformly treated. The length of the stroke of the bars may be altered as required by the rate at which the drum carries away material from the end of the layer, but since the material is discharged only at a rate determined by the speed of rotation of the drum, the movable bars are preferably given a stroke sufficiently long to produce movement of the material at the maximum rate that may be required during different operations. The speed of rotation of the drum is then regulated to determine the rate of discharge.

In some operations, it may be desirable to provide two strata in the layer on the grate, as, for example, the lower layer may be material previously treated or a wholly different material which is employed to absorb heat and thus act as a protection for the grate. For this purpose, the supply hopper 12 may be provided with a partition 12a subdivided into two compartments containing the materials which are to form the respective layers.

In the apparatus illustrated, the inclined support down which the material is advanced with the layer moving as a whole and without internal or localized movements is formed of alternately arranged stationary and movable bars, but it will be apparent that various other constructions may be employed so long as the operating portions of the grate serve to apply an advancing force to one face of the layer and can make their return strokes without agitating or stirring up the material internally.

I claim:

1. A method of subjecting granular or pulverulent material to the action of gases, which comprises continuously feeding the material to the upper end of a gas-permeable support disposed at an angle to the horizontal less than the angle of repose of the material to form a layer of the material on the support, applying a force to a portion of the layer to advance it down and relative to the support, passing the gases through the layer and support, and damming the advancing layer of material at its lower end to insure that the layer will be of substantially uniform thickness, and substantially continuously withdrawing material from the lower end of the layer over the damming means at a controlled rate.

2. A method of subjecting granular or pulverulent material to the action of gases, which comprises continuously feeding the material to the upper end of a gas-permeable support disposed at an angle to the horizontal less than the angle of repose of the material to form a layer of the material on the support, applying a force to a portion of the layer to advance it as a whole down and relative to the support in successive steps, passing the gases through the layer and support, and damming the advancing layer of material at its lower end to insure that the layer will be of substantially uniform thickness, and substantially continuously withdrawing material from the lower end of the layer over the damming means at a controlled rate.

3. A method of subjecting granular or pulverulent material to the action of gases, which comprises continuously feeding the material to the upper end of a gas-permeable support disposed at an angle to the horizontal less than the angle of repose of the material to form a layer of the material on the support, applying a force to a portion of the layer to advance it down and relative to the support, passing the gases through the layer and support, and damming the advancing layer of material at its lower end to insure that the layer will be of substantially uniform thickness, and operating the damming means to substantially continuously discharge material from the lower end of the layer over the damming means at a controlled rate.

4. In apparatus for subjecting granular or pulverulent material to the action of gases, the combination of a gas-permeable support inclined at an angle to the horizontal, means for feeding the material continuously to the upper end of the support to form a layer of the material on the support, means for reciprocating portions of the support lengthwise and in the plane thereof to advance the material down the support, and means at the lower end of the support for damming the advancing layer of material to insure that the layer throughout substantially its entire length will be of a selected, substantially uniform thickness and for controlling a substantially continuous discharge of the material from the lower end of the layer thereof.

5. In apparatus for subjecting granular or pulverulent material to the action of gases, the combination of a gas-permeable support inclined at an angle to the horizontal, means for feeding the material continuously to the upper end of the support to form a layer of the material on the support, means for reciprocating portions of the support lengthwise and in the plane thereof to advance the material down the support, and means beyond the lower end of the support and in the path of the material leaving the support for holding back material leaving the support, said means operating to substantially continuously discharge the material at a selected constant rate and to maintain a layer of the material on the support of a selected, substantially uniform thickness.

6. In apparatus for subjecting granular or pulverulent material to the action of gases, the combination of a gas-permeable support inclined at an angle to the horizontal, means for feeding the material continuously to the upper end of the support to form a layer of the material on the support, means for reciprocating portions of the support lengthwise and in the plane thereof to advance the material down the support, and a rotary member beyond the lower end of the support in the path of the material leaving the support, said member being arranged to dam the advancing layer of material to insure that the layer of material throughout substantially its entire length will be of a selected, substantially uniform thickness and to control a substantially continuous discharge of the material from the lower end of the layer over it.

7. In apparatus for subjecting granular or pulverulent material to the action of gases, the combination of a gas-permeable support inclined at an angle to the horizontal, means for feeding the material continuously thereto at the upper end thereof to form a layer thereon, mechanical means for applying to one face of the layer a force acting to advance the material down and relative to the support, and means in the path of the material leaving the lower end of the support for insuring that the layer of material on the support will be of a selected, substantially uniform thickness and for controlling the rate at which the material travels down the support.

8. Apparatus for subjecting granular or pulverulent material to the action of gases which comprises a chamber, a gas-permeable support mounted within the chamber at an angle to the horizontal, means for supplying the material to the support at its upper end to form a layer thereon, means for applying force to a portion of the layer to cause it to advance as a whole down and relative to the support, means in the path of the material leaving the support for damming the material advancing down the support to insure that the layer of material will be of substantially uniform thickness and for controlling the rate at which the material substantially continuously is discharged from the support, and means for supplying gases to the chamber above the support and for withdrawing them from the chamber beneath the support.

9. Apparatus for subjecting granular or pulverulent material to the action of gases which comprises a chamber, a gas-permeable support mounted within the chamber at an angle to the horizontal, means for supplying material to the support at the upper end thereof to form a layer thereon, means for reciprocating portions of said support lengthwise and in the plane thereof to advance the layer as a whole down the support with a step-wise motion, a rotary drum in the path of the material leaving the support and arranged to dam the material advancing down the support to insure that the layer will be of substantially uniform thickness and for substantially continuously discharging the material over it, said drum also controlling the rate at which the material is discharged from the support, means for receiving material carried forward by the drum, means for supplying gases to the chamber above the support and withdrawing them from the chamber beneath the support, and means for collecting material which has passed through the support and delivering it to said receiving means.

10. In apparatus for subjecting granular or pulverulent material to the action of gases, the combination of a gas-permeable support inclined at an angle to the horizontal, means for supplying the material thereto at the upper end thereof to form a layer thereon, means for applying to one face of the layer a force acting to advance the material down the support, an inclined support beyond the end of the first support for receiving the material therefrom, and a rotary member at the lower end of the second inclined support over which the material substantially continuously is discharged therefrom at a controlled rate.

11. In apparatus for subjecting granular or pulverulent material to the action of gases, the combination of a gas-permeable, main support inclined at an angle to the horizontal and including parts reciprocable lengthwise of the support and in the plane thereof, means for supplying the material to the support at the upper end thereof to form a layer thereon, a stationary inclined support beyond the main support for receiving therefrom material advanced down the main support by the action of said parts, and means in the path of the material leaving the lower end of the stationary support for damming the material advancing down said supports to insure that the layer on the main support will be of substantially uniform thickness and for controlling the rate at which the material travels down the supports, said damming means also operating to substantially continuously discharge material from the lower end of said stationary support.

12. In apparatus for subjecting granular or pulverulent material to the action of gases, the combination of a gas-permeable, main support inclined at an angle to the horizontal and including parts reciprocable lengthwise of the support and in the plane thereof, means for supplying the material to the support at the upper end thereof to form a layer thereon, a stationary inclined support beyond the main support for receiving material advanced down the main support by the action of said parts, and a rotary drum in the path of the material leaving the lower end of the stationary support and arranged to dam the material advancing down the supports to insure that the layer of material on the main support will be of substantially uniform thickness and to cause a substantially continuous discharge of the material from the stationary support over it at a controlled rate.

MIKAEL VOGEL-JORGENSEN.